United States Patent
Zhou et al.

(10) Patent No.: US 12,159,125 B2
(45) Date of Patent: Dec. 3, 2024

(54) PAGE MULTIPLEXING METHOD, PAGE MULTIPLEXING DEVICE, STORAGE MEDIUM AND ELECTRONIC APPARATUS

(71) Applicant: ZHEJIANG LAB, Zhejiang (CN)

(72) Inventors: Tianshu Zhou, Hangzhou (CN); Xin Gao, Hangzhou (CN); Jingsong Li, Hangzhou (CN); Yu Tian, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/525,804

(22) Filed: Nov. 30, 2023

(65) Prior Publication Data
US 2024/0184543 A1    Jun. 6, 2024

(30) Foreign Application Priority Data
Dec. 2, 2022  (CN) .................. 202211544961.X

(51) Int. Cl.
G06F 8/36    (2018.01)
G06F 8/41    (2018.01)

(52) U.S. Cl.
CPC .............. *G06F 8/36* (2013.01); *G06F 8/433* (2013.01)

(58) Field of Classification Search
None
See application file for complete search history.

(56) References Cited

U.S. PATENT DOCUMENTS 8,612,026 B2 * 12/2013 Banik ................. G06F 8/36
                                                    714/33
9,430,583 B1    8/2016 Flake
(Continued)

FOREIGN PATENT DOCUMENTS

CN    101873323 A    10/2010
CN    107368294 A    11/2017
(Continued)

OTHER PUBLICATIONS

Cao, "The Solution of Web Font-end Performance Optimization", 2017, International Congress on Image and Signal Processing (Year: 2017).*

(Continued)

*Primary Examiner* — Hossain M Morshed
(74) *Attorney, Agent, or Firm* — W&G Law Group

(57) ABSTRACT

Disclosed is a page multiplexing method, a page multiplexing device, a storage medium and an electronic apparatus. After obtaining the page frame information of pages to be configured in a client to be developed, a component relational tree corresponding to the plurality of pages can be determined. The component relational tree is compared with a pre-constructed reference relational tree to determine a target tree structure composed of target components from the reference relational tree. Dependencies between target components in the reference relational tree match those in the component relational tree. The component code of the target component used by the developed client is queried to multiplex the component code. The component relational tree corresponding to pages to be developed can be compared with the reference relational tree corresponding to each page included in the developed client to determine the component code that can be multiplexed.

17 Claims, 7 Drawing Sheets

(56) References Cited

U.S. PATENT DOCUMENTS

| | | | | |
|---|---|---|---|---|
| 2004/0153627 | A1* | 8/2004 | Alcazar | G06F 16/958 707/E17.116 |
| 2011/0184543 | A1* | 7/2011 | Banik | G06F 9/45512 700/96 |
| 2012/0239598 | A1* | 9/2012 | Cascaval | G06N 20/00 706/12 |
| 2021/0263834 | A1 | 8/2021 | Reisner et al. | |
| 2022/0253588 | A1* | 8/2022 | Sun | G06F 40/154 |
| 2024/0184543 | A1* | 6/2024 | Zhou | G06F 9/44 |

FOREIGN PATENT DOCUMENTS

| | | | | |
|---|---|---|---|---|
| CN | 108170427 | A | | 6/2018 |
| CN | 109582886 | A | | 4/2019 |
| CN | 111639287 | A | | 9/2020 |
| CN | 112035117 | A | | 12/2020 |
| CN | 112286529 | A * | G06F 8/33 | 1/2021 |
| CN | 112328246 | A | | 2/2021 |
| CN | 112395483 | A | | 2/2021 |
| CN | 112486491 | A | | 3/2021 |
| CN | 113806647 | A | | 12/2021 |
| CN | 113835701 | A | | 12/2021 |
| CN | 113934429 | A | | 1/2022 |
| CN | 114968228 | A | | 8/2022 |
| CN | 115016782 | A | | 9/2022 |
| CN | 115016784 | A * | | 9/2022 |
| CN | 115080046 | A | | 9/2022 |
| EP | 2360576 | A1 | | 8/2011 |
| WO | 2021008287 | A1 | | 1/2021 |

OTHER PUBLICATIONS

First Office Action(CN202211544961.X); Date of Mailing: Apr. 29, 2023.

Notice Of Allowance(CN202211544961.X); Date of Mailing: May 17, 2023.

Review-of-Component-Tree-Theory-and-Methods.

Using-Component-Based-Development-in-J2EE-Application-Project.

Information-Extraction-Based-on-Restricted-Tree-Edit-Distance-and-Navigate-Tree.

* cited by examiner

PAGE MULTIPLEXING METHOD, PAGE MULTIPLEXING DEVICE, STORAGE MEDIUM AND ELECTRONIC APPARATUS

CROSS-REFERENCE TO RELATED APPLICATIONS

The present application claims priority to Chinese Patent Application No. 202211544961.X, filed on Dec. 2, 2022, the content of which is incorporated herein by reference in its entirety.

TECHNICAL FIELD

The present disclosure relates to the technical field of computers, in particular to a page multiplexing method, a page multiplexing device, a storage medium and an electronic apparatus.

BACKGROUND

In front-end engineering, a large number of front-end pages need to be developed with the increase of business volume. In order to reduce the development period for developing front-end pages, the previous front-end pages are multiplexed when developing new front-end pages.

However, in front-end page development, the existing methods of multiplexing pages reduce the efficiency of page multiplex and page development.

SUMMARY

An embodiment of the specification provide a page multiplexing method, a page multiplexing device, a storage medium and an electronic apparatus, so as to partially solve the problems existing in the prior art.

An embodiment of the present disclosure adopt the following technical solutions.

A page multiplexing method provided by the present disclosure includes:
  acquiring page frame information of a plurality of pages to be configured in a client to be developed, the page frame information comprising component information to be used by the plurality of pages;
  determining a component relational tree corresponding to the plurality of pages based on the page frame information, the component relational tree comprising a branch tree corresponding to each page, and for each page, the branch tree corresponding to the page is used for representing dependencies among components comprised in the page;
  comparing the component relational tree with a pre-constructed reference relational tree to determine a target tree structure from the reference relational tree, dependencies among target components comprised in the target tree structure being matched with dependencies of the target components in the component relational tree, and the reference relational tree being constructed based on the pages comprised in a developed client; and
  querying component codes of the target components used by the developed client, and multiplexing the component codes to configure the pages in the client to be developed.

In an embodiment, prior to comparing the component relational tree with the pre-constructed reference relational tree, the method further includes:
  determining the pages comprised in the developed client as reference pages;
  determining dependencies among all components in each reference page through a static analysis;
  determining component information corresponding to each component in each reference page based on the dependencies; and
  constructing the reference relational tree by taking each component in each reference page as a node, for each node in the reference relational tree, the node storing the component information of a component corresponding to the node, and the reference relational tree comprising a branch tree corresponding to each reference page; and for each reference page, the branch tree correspond to the reference page is used for representing the dependencies among the components comprised in the reference page.

In an embodiment, said determining the component information corresponding to each component in each reference page based on the dependencies specifically includes:
  determining, for each component in each reference page, a component template corresponding to the component from the page code corresponding to each reference page based on the dependencies among all components in each reference page;
  converting the component template of the component into a character string;
  matching the character string by a preset regular expression to determine a plurality of label structures comprised in the component template;
  generating an abstract syntax tree AST based on the plurality of label structures; and
  determining the component information corresponding to the component according to the AST.

In an embodiment, the step of determining the component relational tree corresponding to the plurality of pages based on the page frame information specifically includes:
  constructing the component relational tree comprising the branch tree corresponding to each of the plurality of pages by taking each component in the page frame information as a node, for each node in the component relational tree, the node storing the component information of the component corresponding to the node.

In an embodiment, said comparing the component relational tree with a pre-constructed reference relational tree to determine a target tree structure from the reference relational tree specifically includes:
  comparing each component in the component relational tree with each component in the pre-constructed reference relational tree to determine the target tree structure from the reference relational tree based on a depth-first traversal mode.

In an embodiment, said comparing each component in the component relational tree with each component in the pre-constructed reference relational tree to determine the target tree structure from the reference relational tree specifically includes:
  determining whether each component in the component relational tree is a basic component;
  determining whether the component has a child component in the component relational tree if the component is not a basic component;
  determining whether the component exists in the pre-constructed reference relational tree if the component has no child component in the component relational tree;

if the component exists in the reference relational tree, marking the component in the reference relational tree, and determining the marked component as the target component, so as to determine the target tree structure composed of respective target components in the reference relational tree; and if the component does not exist in the reference relational tree, determining whether a next component of the component in the component relational tree is a basic component.

In an embodiment, the method further includes:

determining whether the component exists in the pre-constructed reference relational tree if the component is a basic component;

if the component exists in the reference relational tree, marking the component in the reference relational tree, and determining the marked component as the target component, so as to determine the target tree structure composed of respective target components in the reference relational tree; and if the component does not exist in the reference relational tree, determining whether a next component of the component in the component relational tree is a basic component.

In an embodiment, the method further includes:

if the component has a child component in the component relational tree, determining whether the child component of the component is a basic component in the component relational tree until it is determined that there is no child component.

In an embodiment, the after marking the component in the reference relational tree, the method further includes:

determining whether the component has a child component in the component relational tree;

if the component in the component relational tree has a child component, determining whether the component in the reference relational tree has a child component; and unmarking if the component in the reference relational tree has no child component.

In an embodiment, the method further includes:

if the component in the component relational tree has no child component, determining whether the next component of the component in the component relational tree is a basic component.

In an embodiment, the method further includes:

if the component in the reference relational tree has a child component, determining whether the child component of the component in the component relational tree is a basic component.

In an embodiment, the component information at least includes: a component name, a component path, component dependency data, an event, a child component and a parent component.

In an embodiment, a storage structure of the component relational tree is a storage structure based on a double linked list.

In an embodiment, the component code at least includes: a component style code and a component logic code.

Said multiplexing the component code specifically includes:

determining a number of the target components comprised in the target tree structure in the reference relational tree as a first number;

determining a branch tree comprising the target tree structure and representing a complete page as a target branch tree;

determining a number of components comprised in the target branch tree as a second number;

determining a ratio of the first number to the second number;

multiplexing the component style code and the component logic code in the component code if the ratio is greater than a preset threshold; and multiplexing the component style code in the component code if the ratio is not greater than the preset threshold.

A page multiplexing device provided in the present disclosure includes:

an acquisition module configured for acquiring page frame information of a plurality of pages to be configured in a client to be developed, the page frame information comprising component information to be used by the plurality of pages;

a determination module configured for determining a component relational tree corresponding to the plurality of pages based on the page frame information, the component relational tree comprising a branch tree corresponding to each page, and for each page, the branch tree corresponding to the page is used for representing dependencies among components comprised in the page;

a comparison module configured for comparing the component relational tree with a pre-constructed reference relational tree to determine a target tree structure from the reference relational tree, dependencies among target components comprised in the target tree structure being matched with dependencies of the target components in the component relational tree, and the reference relational tree being constructed based on the pages comprised in a developed client; and a page multiplexing module configured for querying component codes of the target components used by the developed client, and multiplexing the component codes to configure the pages in the client to be developed.

A computer-readable storage medium according to the present disclosure stores a computer program which, when executed by a processor, implements the above page multiplexing method.

An electronic apparatus provided in the present disclosure includes a memory, a processor and a computer program stored in the memory and executable on the processor. When executing the program, the processor implements the above page multiplexing method.

At least one technical solution adopted in an embodiment of the present disclosure can achieve the following beneficial effects:

According to an embodiment of the present disclosure, after obtaining the page frame information of a plurality of pages to be configured in a client to be developed, a component relational tree corresponding to the plurality of pages can be determined. The component relational tree is compared with a pre-constructed reference relational tree to determine a target tree structure composed of target components from the reference relational tree. Dependencies among target components in the reference relational tree are matched with those in the component relational tree. Finally, the component code of the target component used by the developed client is queried to multiplex the component code. In this method, the component relational tree corresponding to a plurality of pages to be developed can be compared with the reference relational tree corresponding to each page included in the developed client to determine the multiplexible component code, so that a plurality of reference pages that can be multiplexed can be found out at one time, and a plurality of reference pages can be multiplexed at one time, thereby improving the page multiplexing efficiency and the page development efficiency.

BRIEF DESCRIPTION OF DRAWINGS

The drawings described here are used to provide a further understanding of the present disclosure and constitute a part of the present disclosure. The illustrative embodiments of the present disclosure and their descriptions are used to explain the present disclosure and do not constitute undue limitations on the present disclosure. In the drawings.

DESCRIPTION OF EMBODIMENTS

The page multiplexing method in the present disclosure aims to compare a front-end page project to be developed with the developed front-end page project, so as to find out the page codes that the front-end page project to be developed can multiplex from the developed front-end page project.

In order to make the object, technical solution and advantages of the present disclosure more clear, the technical solution of the present disclosure will be described clearly and completely with specific embodiments of the present disclosure and corresponding drawings. Obviously, the described embodiment is only a part of, but not all embodiments in the present disclosure. Based on the embodiments in the present disclosure, all other embodiments obtained by those skilled in the art without creative effort shall fall into the scope of protection in the present disclosure.

Hereinafter, the technical solution provided by each embodiment of the present disclosure will be described in detail with the attached drawings.

Figure 1:
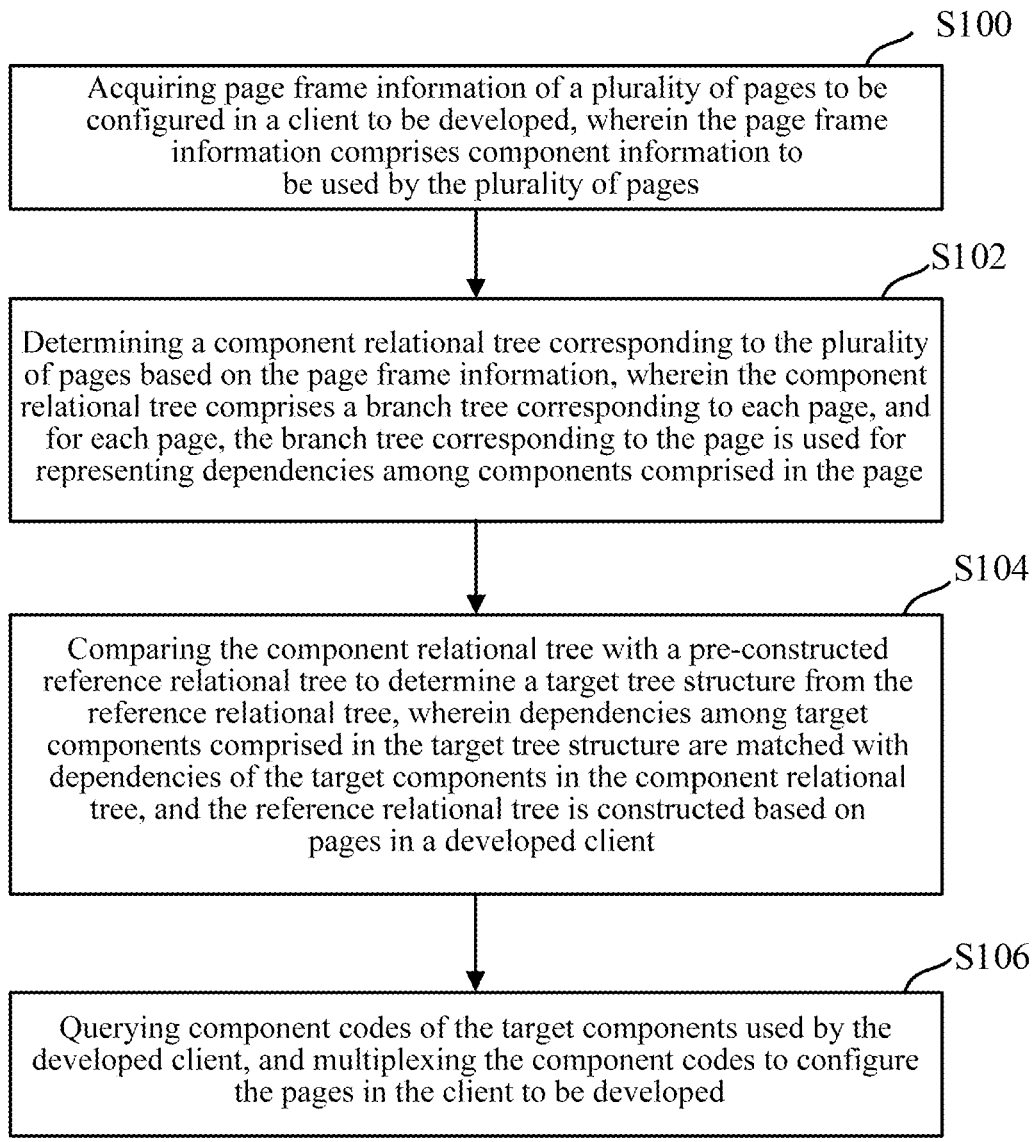
FIG. 1 is a flowchart of a page multiplexing method provided by an embodiment of the present disclosure.

FIG. 1 is a flow diagram of a page multiplexing method provided by an embodiment of the present disclosure, including the following steps:

In S100, page frame information of a plurality of pages to be configured in a client to be developed is acquired; the page frame information comprises component information to be used by the plurality of pages.

In the present disclosure, depending on business requirements, it is necessary to develop client software that meets business requirements. For the front end, front-end developers need to configure (or develop) a plurality of pages for the client to be developed as the front-end page project of the client.

Specifically, the page frame information of a plurality of pages to be configured in the client to be developed is obtained. The page frame information contains component information that a plurality of pages need to use. The component information that each page needs to use at least includes: a component name, a component path, component dependency data, an event, a child component, a parent component, etc. The component path can refer to the path to access the component, and the component dependency data can be the dependency data used inside the component or passed from other components. The event can refer to an event triggered by the component in different states, such as a click event and an input event. For a button component, when the button component is clicked, a page jump may occur. For an input box component, when the input box component is triggered, the input keyboard may pop up.

For example, if the front-end page project of the client needs to configure a plurality of pages including: a first page for text query and displaying various texts through charts, and a second page for viewing query results and editing texts. For the first page, the components included in the page frame of the first page include: input boxes, buttons, charts and text query components, among which the input boxes, buttons and charts belong to basic components, while the text query components belong to non-basic components, which may refer to self-named components composed of a plurality of basic components. For the second page, the components included in the page frame of the second page include: buttons, forms, dialog boxes, common dialog boxes, editing dialog boxes, tables, paginations and result components, among which buttons, forms, dialog boxes, tables and pagination are basic components, while common dialog boxes, editing dialog boxes and result components are non-basic components. Among them, the dialog box is composed of buttons and forms, the ordinary dialog box is composed of dialog boxes, the editing dialog box is composed of ordinary dialog boxes, the table is composed of editing dialog boxes and buttons, and the result component is composed of tables and paginations.

In S102, a component relational tree corresponding to the plurality of pages is determined based on the page frame information; the component relational tree comprises a branch tree corresponding to each page, and for each page, the branch tree corresponding to the page is used for representing dependencies among components comprised in the page.

In an embodiment of the present disclosure, after obtaining the page frame information, the component relational tree corresponding to a plurality of pages can be determined according to the page frame information. The component relational tree can refer to all components that need to be included in a plurality of pages. In addition, the component relational tree can be a multi-branch tree.

Figure 2:
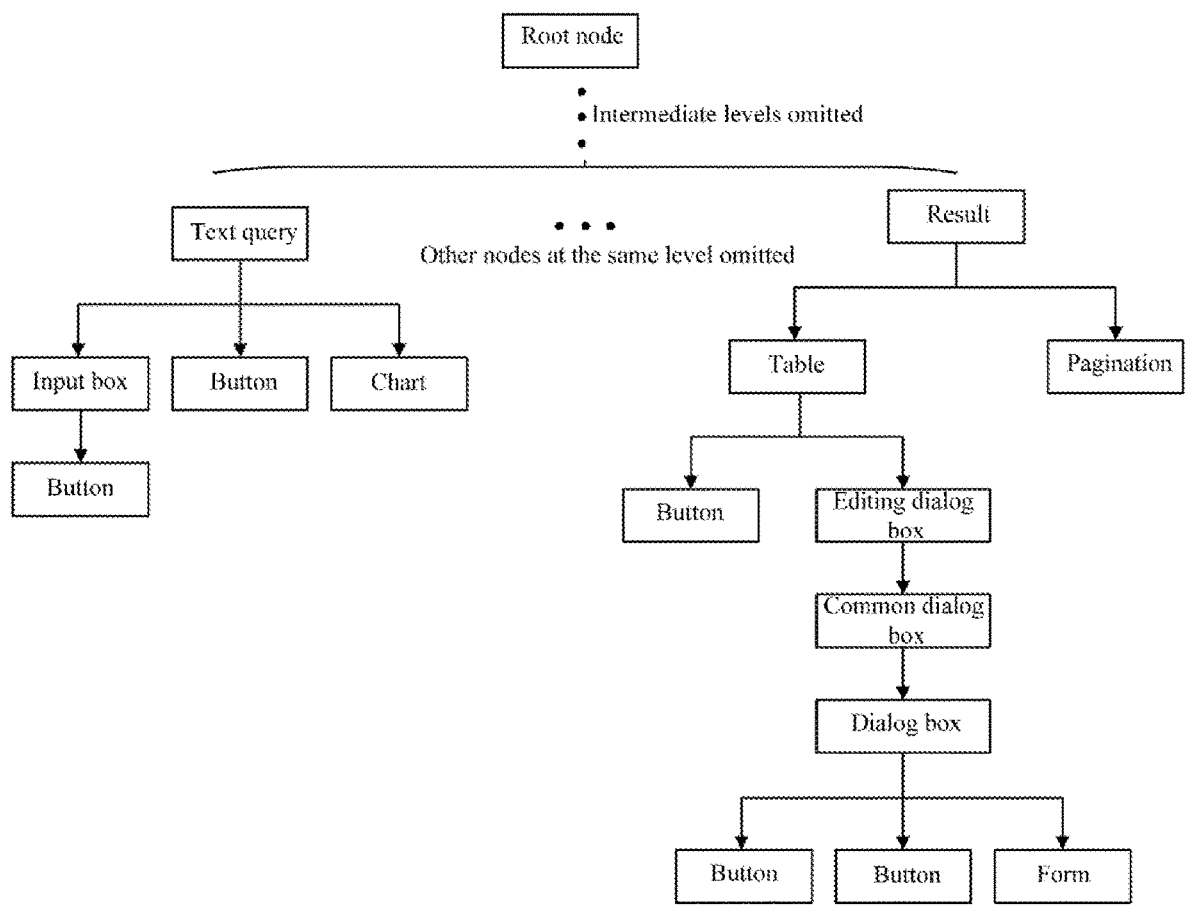
FIG. 2 is a schematic diagram of a component relational tree provided by an embodiment of the present disclosure.

Specifically, based on the component information that a plurality of pages need to use in the page frame information, the components that a plurality of pages need to contain and the dependencies among them can be determined. Then, with each component as the node and the dependencies among components as the edges, a component relational tree of a page frame containing a plurality of pages is constructed. For each node in the component relational tree, the node stores the component information of the component corresponding to the node. In addition, the component relational tree contains a branch tree corresponding to each page, and for each page, the branch tree corresponding to this page is used to represent the dependencies among the components comprised in this page. As shown in FIG. 2.

In FIG. 2, the branch tree in the left part of the component relational tree is the page of query text, and the branch tree in the right part is the page of displaying and editing query results.

In S104, the component relational tree is compared with a pre-constructed reference relational tree to determine a target tree structure from the reference relational tree; dependencies among target components comprised in the target tree structure are matched with dependencies of the target components in the component relational tree, and the reference relational tree is constructed based on the pages included in a developed client; and In an embodiment of the present disclosure, the component relational tree can be compared with the pre-constructed reference relational tree to determine the target tree structure from the reference relational tree, and the components comprised in the target tree structure can be taken as the target components. The dependencies among target components included in the target tree structure are matched with the dependencies of target components in the component relational tree. In addition, the reference relational tree is constructed based on the pages included in the developed client.

In an embodiment of the present disclosure, before comparing the component relational tree with the reference relational tree, it is necessary to construct the reference relational tree first.

Specifically, the pages included in the developed client are determined as reference pages. Then, the dependencies among all components in each reference page are determined through a static analysis. Then, based on the dependencies among all components in each reference page, the component information corresponding to each component in each reference page is determined. Finally, a reference relational tree is constructed with each component in each reference page as a node. For each node in the reference relational tree, the node stores the component information of the component corresponding to the node. In addition, the reference relational tree contains a branch tree corresponding to each reference page, and for each reference page, the branch tree corresponding to the reference page is used to represent the dependencies among the components included in the reference page.

In order to improve the efficiency of constructing a reference relational tree, at least some reference pages can be selected from the developed client. Then, a reference relational tree is constructed with at least some components in the reference page as nodes. The reference relational tree contains a branch tree corresponding to at least some reference pages, and for each reference page in at least some reference pages, the branch tree corresponding to the reference page is used to represent the dependencies among components included in the reference page.

When determining the component information corresponding to each component in each reference page, for each component in each reference page, a component template corresponding to this component is determined from the page code corresponding to each reference page based on the dependencies among all components in each reference page. The component template of the component is then converted into a character string. The character string is matched through a preset regular expression to determine the plurality of label structures included in the component template of the component. Then, based on a plurality of label structures, an abstract syntax tree AST is generated, and the component information corresponding to the component is determined according to the AST. The page code can refer to the code written by html Hypertext Markup Language. The component template can refer to a template code that represents the structure of a plurality of attributes of the component. The label structure can refer to the code that represents the structure of a plurality of attributes included in the component template.

When determining the plurality of label structures included in the component template of the component, the codes in the positive and negative labels included in the character string can be identified through the preset regular expression. The positive and negative labels appear in pairs, and one pair of positive and negative labels corresponds to an attribute of the component. In addition, one pair of positive and negative labels may be embedded with child positive and negative labels, and one pair of child positive and negative labels correspond to a child attribute.

For example: <head><meta charset="utf-8"/><title> is the title</title></head>, and a pair of positive and negative labels is <head></head>. The codes in this pair of positive and negative labels define that character set and title used by the browser to parse the web page, and the codes in the other pair of positive and negative labels <title></title> define the title.

When generating the abstract syntax tree AST, a plurality of label structures can be used as nodes to generate the abstract syntax tree AST.

For each component, after generating the abstract syntax tree corresponding to the component, the component information corresponding to the component can be determined according to the abstract syntax tree, and the component information of the component can be taken as the feature of the node corresponding to the component in the reference relational tree.

Figure 3:
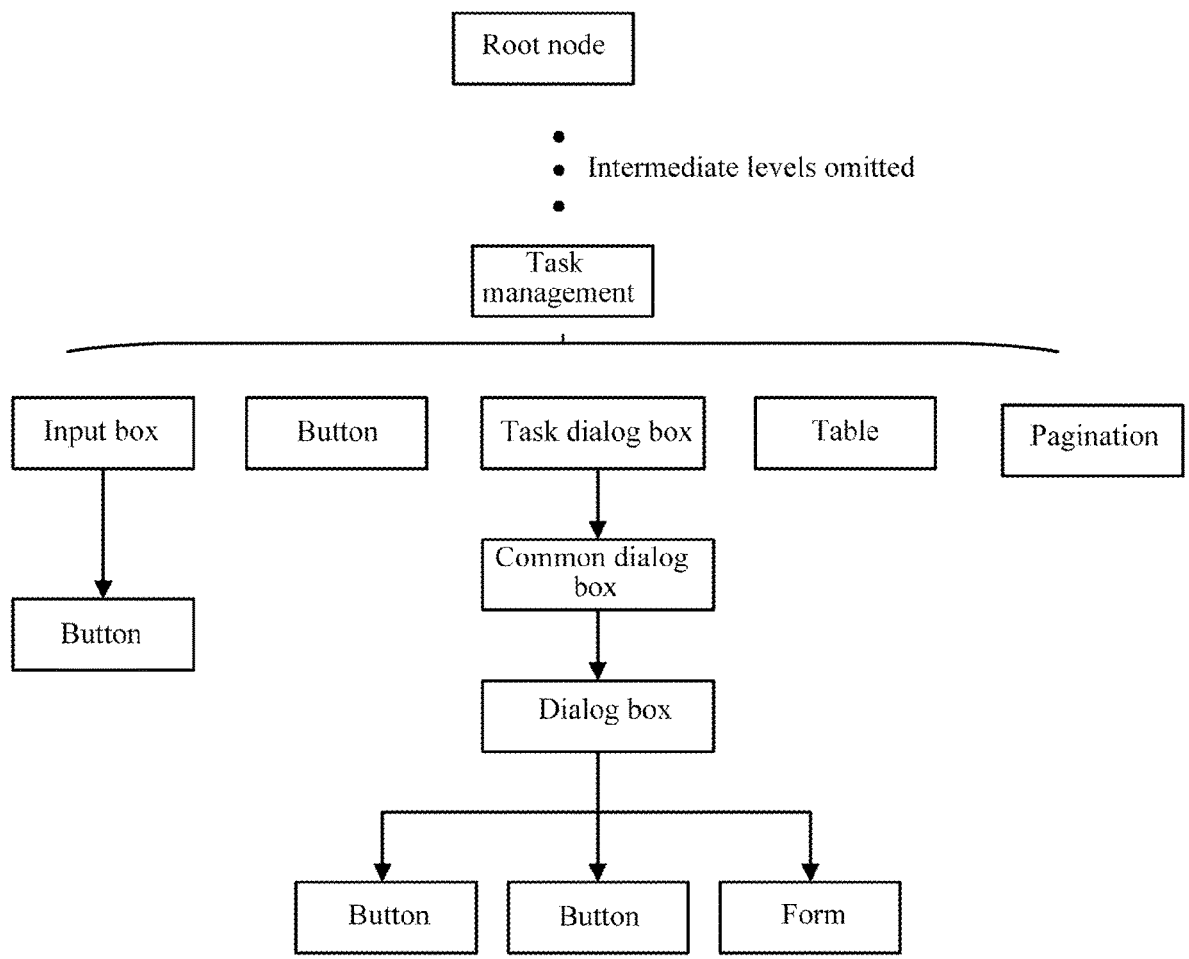
FIG. 3 is a schematic diagram of a reference relational tree provided by an embodiment of the present disclosure.

Aft determining that component information correspond to each component, a reference relational tree can be constructed by taking the components correspond to a plurality of reference pages as nodes and taking the component information corresponding to the components as a feature, as shown in FIG. 3.

In FIG. 3, taking a task management page as an example, a reference relational tree is constructed based on the components in the task management page. In the reference relational tree, the task management page is composed of input boxes, buttons, task dialog boxes, tables, paginations and other components. The input box is composed of buttons, and the task dialog box is composed of ordinary dialog boxes, dialog boxes, two buttons and forms.

After constructing the reference relational tree, the component relational tree may be compared with the reference relational tree.

Specifically, each component in the component relational tree can be compared with the pre-constructed reference relational tree by depth-first traversal, so as to determine the target tree structure from the reference relational tree.

Figure 4:
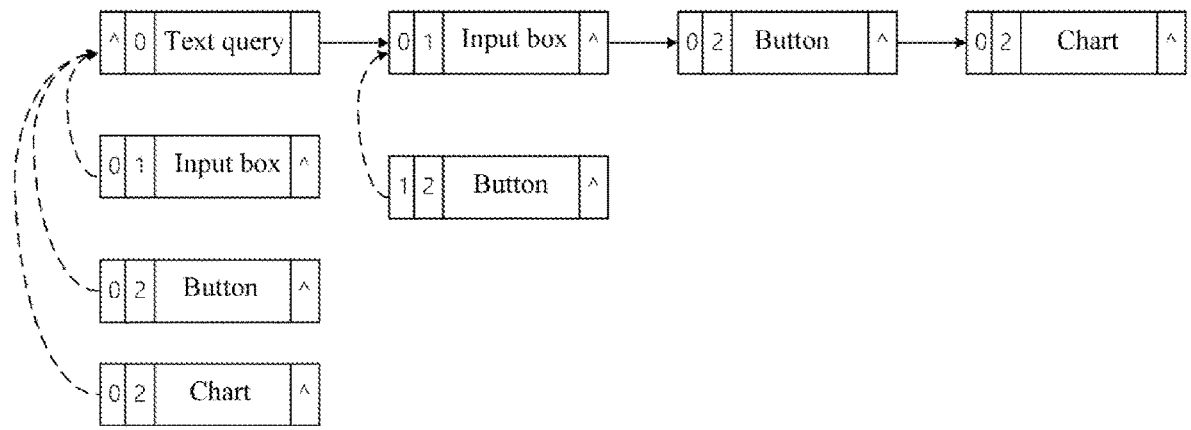
FIG. 4 is a schematic diagram of the storage structure of each component node in the component relational tree provided by an embodiment of the present disclosure.

In order to find the child components and parent components of a component easily during depth-first traversal, the component relational tree can adopt the storage structure of double linked list, as shown in FIG. 4. In FIG. 4, taking a page of text query as an example, a text query node is the main component of the page, an input box node, a button node and a chart node are the child components of the text query, and the other button is the child component of the input box node.

When comparing the component relational tree with the reference relational tree, it is judged whether the component is a basic component for each component in the component relational tree.

If the component is not a basic component, it is judged whether there are child components in the component relational tree.

If the component has no child components in the component relational tree, it is judged whether the component exists in the pre-constructed reference relational tree. If the component exists in the reference relational tree, the component is marked in the reference relational tree, and the component is marked in the component relational tree. After marking the component, the marked component is determined as a target component. If the component does not exist in the reference relational tree, it continues to judge whether the next component of the component in the component relational tree is a basic component, and continues to judge whether the next component exists in the reference relational tree until the traversal of the component relational tree is finished.

When determining whether the component exists in the pre-constructed reference relational tree, the component in the component relational tree can be matched with all components in the reference relational tree, and if the matching is successful, it is determined that the component exists in the reference relational tree. Specifically, for each component in the reference relational tree, the similarity between the component information corresponding to the component in the component relational tree and the component information of the component in the reference relational tree can be determined. If the similarity is greater than a threshold, it is determined that the component in the component relational tree is matched with the component in the reference relational tree.

If the component has child components in the component relational tree, it is judged whether the child components of the component are basic components in the component relational tree until it is determined that there are no child components.

If the component is a basic component, it is judged whether the component exists in the pre-constructed reference relational tree. If the component exists in the reference relational tree, the component is marked in the reference relational tree and the component is marked in the component relational tree. After marking the component, the marked component is determined as the target component. If the component does not exist in the reference relational tree, it is judged whether the next component of the component in the component relational tree is a basic component, and it continues to judge whether the next component exists in the reference relational tree until the traversal of the component relational tree is finished.

In any page, there are some basic components in the page. Therefore, when comparing the component relational tree with the reference relational tree, it is very common that the nodes at the same level are exactly the same. However, the similarity of nodes at the same level does not mean that the whole page is similar. The similarity of any two pages should be that any two branches in the component relational tree and the reference relational tree are similar. Therefore, when only one level of nodes are similar, in order to improve the comparison accuracy, the components with similarity in only one level of nodes can be ignored.

Specifically, after marking the component in the reference relational tree, it is judged whether there are child components in the component relational tree. If the component in the component relational tree has a child component, it is judged whether the component in the reference relational tree has a child component. If there is no child component of this component in the reference relational tree, the marking is cancelled. If there are child components in the component in the reference relational tree, it is judged whether the child components in the component relational tree are basic components until the component relational tree is traversed.

If there is no child component in the component relational tree, it is judged whether the next component in the component relational tree is a basic component until the component relational tree is traversed.

After traversing the component relational tree by depth-first traversal, a tree structure composed of marked components (that is, target components) can be determined from the reference relational tree as the target tree structure. Since the target components are also marked in the component relational tree, a tree structure composed of marked components (i.e., target components) can also be determined from the component relational tree as the target tree structure. Among them, the target tree structure can be multiple, and each page to be configured by the client to be developed corresponds to one target tree structure.

It should be noted that the next component of this component may be a child component of this component or other components at the same level of this component.

Figure 5:
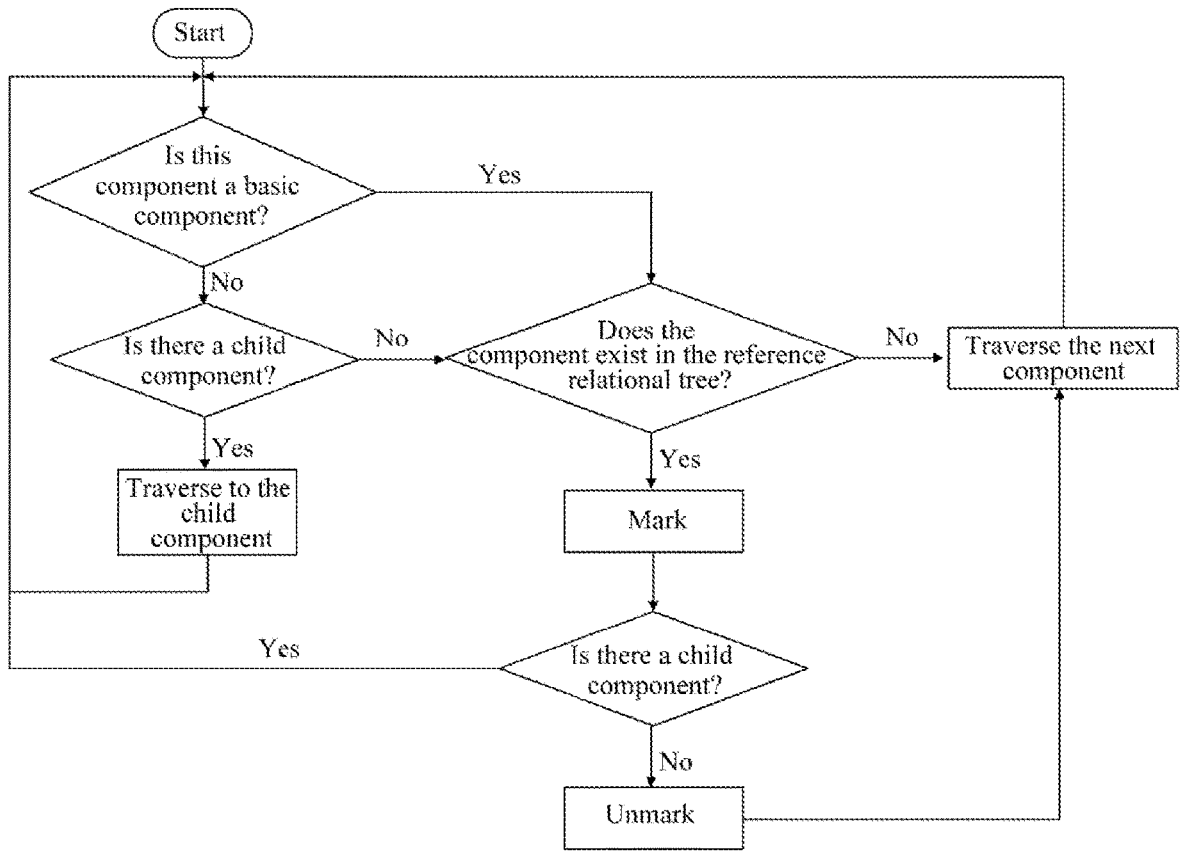
FIG. 5 is a schematic diagram of depth-first traversal provided by an embodiment of the present disclosure.

Based on the above-mentioned depth-first traversal of the component relational tree, a schematic diagram of depth-first traversal is provided in an embodiment of the present disclosure, as shown in FIG. 5.

Figure 6:
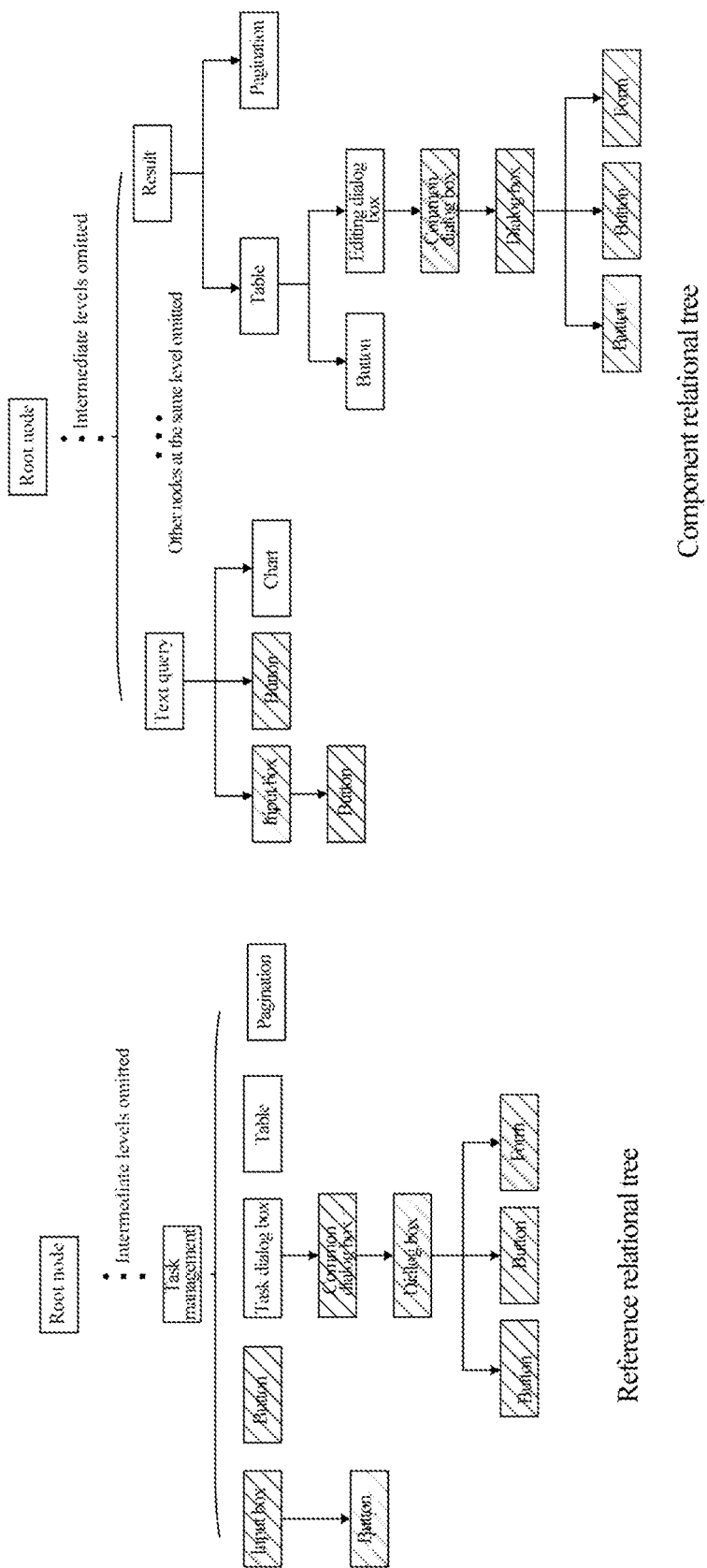
FIG. 6 is a schematic diagram of marking target components in a component relational tree and a reference relational tree provided by an embodiment of the present disclosure.

Based on the above comparison between the component relational tree and the reference relational tree, a schematic diagram of marking target components in the component relational tree and the reference relational tree is provided in an embodiment of the present disclosure, as shown in FIG. 6. In FIG. 6, for the component relational tree and the reference relational tree, the components covered with gray diagonal lines are the target components.

In addition, after traversing the component relational tree in a depth-first traversal mode, when determining the target tree structure, not only the tree structure composed of components marked from the reference relational tree is taken as the target tree structure, but also the smallest branch tree containing marked components can be determined from the reference relational tree as the target tree structure according to the components marked in the reference relational tree, and each component in the target tree structure is taken as the target component, for example, the branch tree including the task dialog component in FIG. 6 and the branch tree including the edit dialog component in FIG. 6.

In S106, the component code of the target component used by the developed client is queried, and the component code is multiplexed to configure the pages in the client to be developed.

In an embodiment of the present disclosure, after the target tree structure is determined in the reference relational tree, the component codes of the target components used by the developed client can be queried according to the target components included in the target tree structure. Then, the component codes of the queried target components are multiplexed to configure the page in the client to be developed. The component code at least includes the logic code when the component executes services and the style code of the component. The logic code may refer to the code that triggers events when a component executes different services, such as asynchronous request and event handling. The style code may represent the shape, size, color of the component.

When multiplexing the component codes of the queried target components, it may be started from the perspective of page multiplexing. If the target structure tree occupies a small proportion in the branch tree representing the complete reference page, it means that the similarity between the page to be developed or configured and the developed reference page is small, then the logic codes of the components in the reference page and the page to be developed may be different, but the styles of the components in the reference page and the page to be developed are similar, therefore, the style codes of the components in the reference page can be multiplexed. If the target structure tree accounts for a large proportion in the branch tree representing the complete reference page where the target structure tree is located, it means that the page to be developed or configured is similar to the developed reference page, then the logics of the reference page and the page to be developed are similar, therefore the style code and logic code of the components in the reference page can be directly multiplexed.

Specifically, in the reference relational tree, the number of target components included in the target tree structure is determined as a first number. In the reference relational tree, the branch tree that contains the target tree structure and represents the complete page is determined as the target branch tree. Then, the number of components included in the target branch tree is determined as a second number. After that, the ratio of the first number to the second number is determined.

If the ratio is greater than a preset threshold, the component style code and the component logic code in the component code are multiplexed; if the ratio is not greater than the preset threshold, the component style code in the component code is multiplexed.

When configuring the page to be developed, the component code of each target component in each target tree structure may be injected into the page frame by calling the import command to configure the corresponding page and get a plurality of pages.

It should be noted that all the actions of obtaining signals, information or data in this application are carried out under the premise of complying with the corresponding data protection laws and policies of the country where it is located and obtaining authorization from the corresponding device owners.

It can be seen from the method shown in FIG. 1 above that the present disclosure can determine the component relational tree corresponding to a plurality of pages after obtaining the page frame information of the plurality of pages to be configured in the client to be developed. The component relational tree is compared with the pre-constructed reference relational tree to determine the target tree structure composed of target components from the reference relational tree. Dependencies among target components in the reference relational tree are matched with those in the component relational tree. Finally, the component code of the target component used by the developed client is queried to multiplex the component code. In this method, the component relational tree corresponding to a plurality of pages to be developed can be compared with the reference relational tree corresponding to each page included in the developed client to determine the multiplexible component code, so that a plurality of reference pages that can be multiplexed can be found at one time, and a plurality of reference pages can be multiplexed at one time, which improves the page multiplex efficiency and the page development efficiency.

The above is the page multiplexing method provided by an embodiment of the present disclosure. Based on the same concept, the present disclosure further provides a corresponding device, a storage media and an electronic apparatus.

Figure 7:
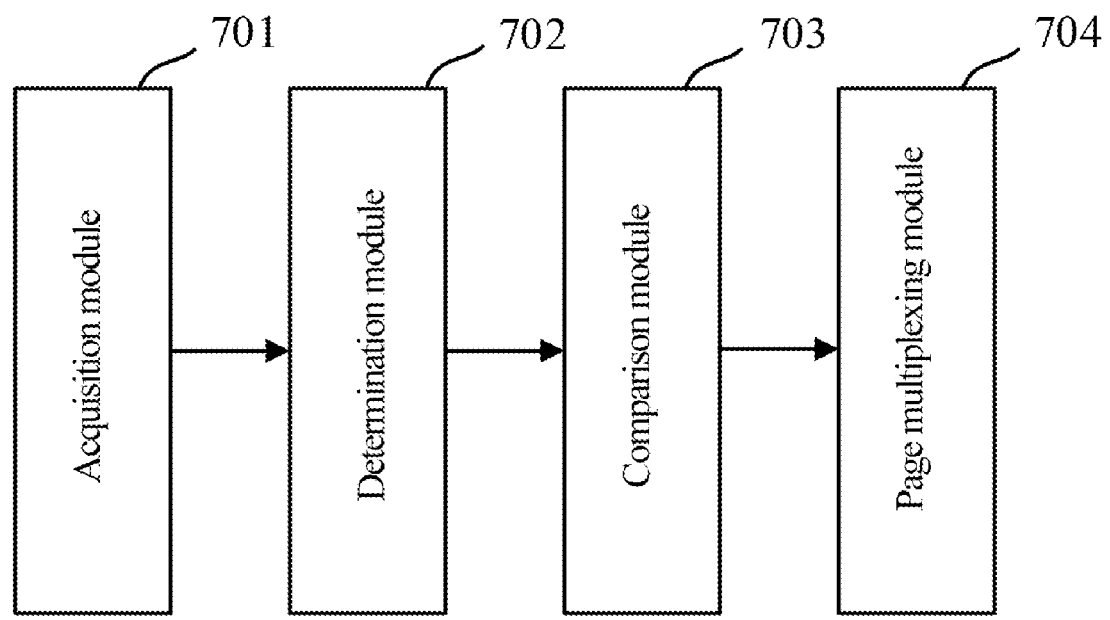
FIG. 7 is a schematic structural diagram of a page multiplexing device provided by an embodiment of the present disclosure.

FIG. 7 is a structural diagram of a page multiplexing device provided by an embodiment of the present disclosure, and the device includes:

an acquisition module 701 configured for acquiring page frame information of a plurality of pages to be configured in a client to be developed, wherein the page frame information comprises component information to be used by the plurality of pages;

a determination module 702 configured for determining a component relational tree corresponding to the plurality of pages based on the page frame information, wherein the component relational tree comprises a branch tree corresponding to each page, and for each page, the branch tree corresponding to the page is used for representing dependencies among components comprised in the page;

a comparison module 703 configured for comparing the component relational tree with a pre-constructed reference relational tree to determine a target tree structure from the reference relational tree, wherein dependencies among target components comprised in the target tree structure are matched with dependencies of the target components in the component relational tree, and the reference relational tree is constructed based on the pages comprised in a developed client; and a page multiplexing module 704 configured for querying component codes of the target components used by the developed client, and multiplexing the component codes to configure the pages in the client to be developed.

In an embodiment, prior to comparing the component relational tree with the pre-constructed reference relational tree, the determination module 702 is further configured for determining the pages comprised in the developed client as reference pages; determining dependencies among all components in each reference page through a static analysis; determining component information corresponding to each component in each reference page based on the dependencies; and constructing the reference relational tree by taking each component in each reference page as a node. For each node in the reference relational tree, the node stores the component information of a component corresponding to the node, and the reference relational tree comprises a branch tree corresponding to each reference page; and for each reference page, the branch tree correspond to the reference page is used for representing the dependencies among the components comprised in the reference page.

In an embodiment, the determination module 702 is further configured for determining, for each component in each reference page, a component template corresponding to the component from the page code corresponding to each reference page based on the dependencies among all components in each reference page; converting the component template of the component into a character string; matching the character string by a preset regular expression to determine a plurality of label structures comprised in the component template; generating an abstract syntax tree AST based on the plurality of label structures; and determining the component information corresponding to the component according to the AST.

In an embodiment, the determination module 702 is specifically configured for constructing the component relational tree comprising the branch tree corresponding to each of the plurality of pages by taking each component in the page frame information as a node, wherein for each node in the component relational tree, the node stores the component information of the component corresponding to the node.

In an embodiment, the comparison module 703 is specifically configured for comparing each component in the component relational tree with each component in the pre-constructed reference relational tree to determine the target tree structure from the reference relational tree based on a depth-first traversal mode.

In an embodiment, the comparison module 703 is specifically configured for determining whether each component in the component relational tree is a basic component; determining whether the component has a child component in the component relational tree if the component is not a basic component; determining whether the component exists in the pre-constructed reference relational tree if the component has no child component in the component relational tree; if the component exists in the reference relational tree, marking the component in the reference relational tree, and determining the marked component as the target component, so as to determine the target tree structure composed of respective target components in the reference relational tree; and if the component does not exist in the reference relational tree, determining whether a next component of the component in the component relational tree is a basic component.

In an embodiment, the comparison module 703 is further configured for determining whether the component exists in the pre-constructed reference relational tree if the component is a basic component; if the component exists in the reference relational tree, marking the component in the reference relational tree, and determining the marked component as the target component, so as to determine the target tree structure composed of respective target components in the reference relational tree; and if the component does not exist in the reference relational tree, determining whether a next component of the component in the component relational tree is a basic component.

In an embodiment, the comparison module 703 is further configured for, if the component has a child component in the component relational tree, determining whether the child component of the component is a basic component in the component relational tree until it is determined that there is no child component.

In an embodiment, the comparison module 703 is further configured for determining whether the component has a child component in the component relational tree; if the component in the component relational tree has a child component, determining whether the component in the reference relational tree has a child component; and unmarking if the component in the reference relational tree has no child component.

In an embodiment, the comparison module 703 is further configured for, if the component in the component relational tree has no child component, determining whether the next component of the component in the component relational tree is a basic component.

In an embodiment, the comparison module 703 is further configured for, if the component in the reference relational tree has a child component, determining whether the child component of the component in the component relational tree is a basic component.

In an embodiment, the component information at least includes a component name, a component path, component dependency data, an event, a child component and a parent component.

In an embodiment, a storage structure of the component relational tree is a storage structure based on a double linked list.

In an embodiment, the component code at least includes: a component style code and a component logic code.

In an embodiment, the page multiplexing module 704 is specifically configured for determining a number of the target components comprised in the target tree structure in the reference relational tree as a first number; determining a branch tree comprising the target tree structure and representing a complete page as a target branch tree; determining a number of components comprised in the target branch tree as a second number; determining a ratio of the first number to the second number; multiplexing the component style code and the component logic code in the component code if the ratio is greater than a preset threshold; and multiplexing the component style code in the component code if the ratio is not greater than the preset threshold.

The present disclosure further provides a computer-readable storage medium, which stores a computer program, which, when executed by a processor, can be used to execute the page multiplexing method provided in FIG. 1.

Figure 8:
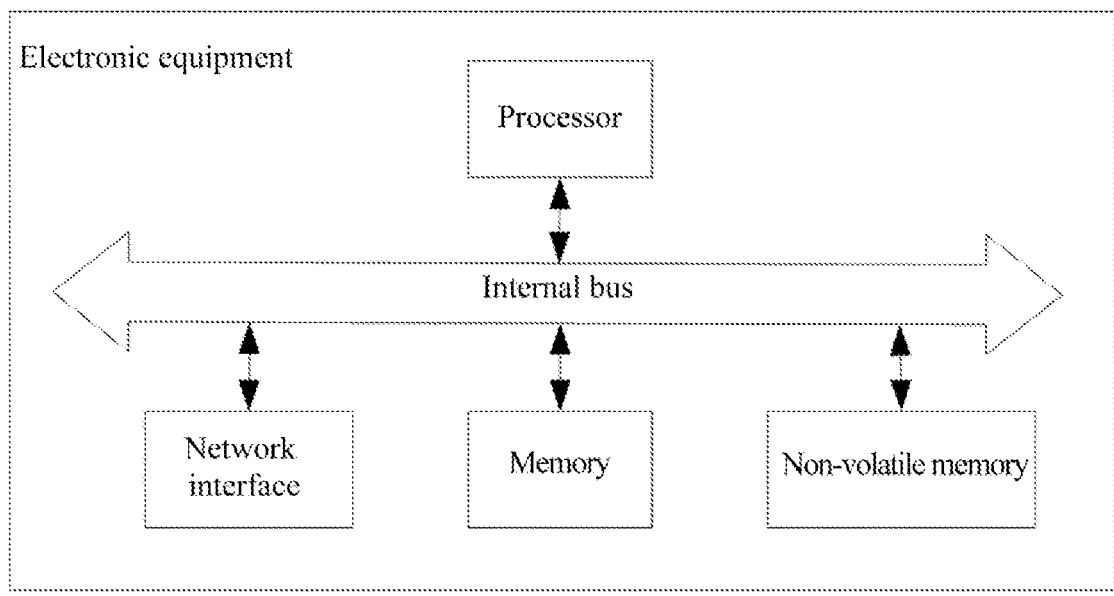
FIG. 8 is a schematic structural diagram of an electronic apparatus provided by an embodiment of the present disclosure.

Based on the page multiplexing method shown in FIG. 1, an embodiment of the present disclosure further provides the structural schematic diagram of the electronic apparatus shown in FIG. 8. As shown in FIG. 8, on the hardware level, the electronic apparatus includes a processor, an internal bus, a network interface, a memory, a nonvolatile memory, and of course, hardware required by other services. The processor reads the corresponding computer program from the nonvolatile memory into the memory and then runs the program to implement the page multiplexing method described in FIG. 1 above.

Besides the software implementation, the present disclosure does not exclude other implementations, such as logic devices or the combination of software and hardware, etc., that is to say, the execution subject of the following processing flow is not limited to each logic unit, but also can be hardware or logic devices.

In the 1990s, the improvement of a technology can be clearly distinguished as a hardware improvement (for example, the improvement of the circuit structure of diodes, transistors, switches, etc.) or a software improvement (the improvement of the method flow). However, with the development of technology, the improvement of many methods and processes can be regarded as the direct improvement of the hardware circuit structure. Almost all designers obtain the corresponding hardware circuit structure by programming the improved method flow into the hardware circuit. Therefore, it cannot be said that the improvement of a method flow cannot be realized by hardware entity modules. For example, Programmable Logic Device, PLD) (such as Field Programmable Gate Array (FPGA)) is such an integrated circuit, and its logic function is determined by the user programming the device. Designers program to "integrate" a digital system on a PLD, without the need to ask chip manufacturers to design and make special integrated circuit chips. Moreover, nowadays, instead of making integrated circuit chips by hand, this programming is mostly realized by using "logic compiler" software, which is similar to the software compiler used in program development and writing, and the original codes before compilation must be written in a specific programming language, which is called Hardware Description Language (HDL). There is not only one kind of HDL, but many kinds, for example Abel (Advanced Boolean Expression Language), AHDL (Altera Hardware Description Language), Confluence, Cupl (Cornell University Programming Language), HDCal, JHDL (Java Hardware Description Language), Lava, Lola, MyHDL, PALASM, RHDL (Ruby Hardware Description Language), etc. At present, VHDL (Very-High-Speed Integrated Circuit Hardware Description Language) and Verilog are most commonly used. It should also be clear to those skilled in the art that the hardware circuit for realizing the logical method flow can be easily obtained only by slightly programming the method flow in the above-mentioned hardware description languages and programming it into the integrated circuit.

The controller can be implemented in any suitable way, for example, the controller can take the form of a microprocessor or a processor and a computer-readable medium, a logic gate, a switch, an Application Specific Integrated Circuit (ASIC), a programmable logic controller and an embedded microcontroller. Examples of the controller include but are not limited to the following microcontrollers: ARC 625D, Atmel AT91SAM, Microchip PIC18F26K20 and Silicone Labs C8051F320. The memory controller can also be implemented as a part of the control logic of the memory. Those skilled in the art also know that it is entirely possible to make the controller realize the same function in the form of a logic gate, a switch, an Application Specific Integrated Circuit, a programmable logic controller and an embedded microcontroller by logically programming the method steps, in addition to implementing the controller by way of pure computer-readable program codes. Therefore, this controller can be regarded as a hardware component, and the devices for implementing various functions included therein can also be regarded as structures in the hardware component. Or, the means for realizing various functions can be regarded as both a software module for implementing the method and a structure within a hardware component.

The system, device, modules or units set forth in the above embodiments can be implemented by computer chips or entities, or by products with certain functions. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device or a combination of any of these devices.

For the convenience of description, when describing the above devices, the functions are divided into various units and described separately. Of course, the functions of each unit can be implemented in the same software and/or hardware when carrying out the present disclosure.

It should be appreciated by those skilled in the art that embodiments of the present disclosure can be provided as methods, systems, or computer program products. Therefore, the present disclosure can take the form of an entirely hardware embodiment, an entirely software embodiment, or an embodiment combining software and hardware aspects. Moreover, the present disclosure can take the form of a computer program product implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to embodiments of the present disclosure. It should be appreciated that each flow and/or block in the flowchart and/or block diagram, and combinations of the flow and/or block in the flowchart and/or block diagram can be implemented by computer program instructions. These computer program instructions may be provided to a processor of a general-purpose computer, a special-purpose computer, an embedded processor or other programmable data processing apparatus to produce a machine, such that the instructions which are executed by the processor of the computer or other programmable data processing apparatus produce devices for implementing the functions specified in the flowchart flow or flows and/or block or blocks in the block diagram.

These computer program instructions may also be stored in a computer-readable memory that can direct a computer or other programmable data processing apparatus to function in a particular manner, such that the instructions stored in the computer-readable memory produce an article of manufacture including instruction devices that implement the functions specified in flow or flows and/or block or blocks of the block diagram.

These computer program instructions may also be loaded onto a computer or other programmable data processing apparatus, such that a series of operational steps are performed on the computer or other programmable apparatus to produce a computer-implemented process, such that the instructions executed on the computer or other programmable apparatus provide steps for implementing the functions specified in the flowchart flow or flows and/or block or blocks of the block diagram.

In a typical configuration, a computing device includes one or more processors (CPU), input/output interfaces, network interfaces, and memories.

The memory may include non-permanent memory, random access memory (RAM) and/or nonvolatile memory in computer-readable media, such as read-only memory (ROM) or flash memory. Memory is an example of a computer-readable medium.

Computer-readable media, including permanent and non-permanent, removable and non-removable media, can store information by any method or technology. Information can be computer-readable instructions, data structures, modules of programs or other data. Examples of storage media for computers including but not limited to, phase-change memory (PRAM), static random access, memory (SRAM), dynamic random access memory (DRAM), other types of random access memories (RAM), read-only memory (ROM), electrically erasable programmable read-only memory (EEPROM), flash memory or other memory technologies, CD-ROM, digital versatile disc (DVD) or other optical storages, and magnetic cassettes, magnetic tape magnetic disk storage or other magnetic storage devices or any other non-transmission media, can be used to store information that can be accessed by computing devices. According to the definition herein, computer-readable media does not include transitory media, such as modulated data signals and carrier waves.

It should also be noted that the terms "including", "comprising" or any other variation thereof are intended to cover non-exclusive inclusion, so that a process, method, commodity or apparatus including a series of elements includes not only those elements, but also other elements not explicitly listed, or elements inherent to such process, method, commodity or apparatus. Without more restrictions, an element defined by the phrase "including one" does not exclude the existence of other identical elements in the process, method, commodity or apparatus including the element.

It should be appreciated by those skilled in the art that embodiments of the present disclosure can be provided as methods, systems or computer program products. Therefore, the present disclosure can take the form of an entirely hardware embodiment, an entirely software embodiment or an embodiment combining software and hardware aspects. Moreover, the present disclosure can take the form of a computer program product implemented on one or more computer-usable storage media (including but not limited to disk storage, CD-ROM, optical storage, etc.) containing computer-usable program codes.

The present disclosure may be described in the general context of computer-executable instructions, such as program modules, being executed by a computer. Generally, program modules include routines, programs, objects, components, data structures and the like that perform particular tasks or implement particular abstract data types. The specification may also be practiced in distributed computing environments where tasks are performed by remote processing devices that are connected through a communication network. In a distributed computing environment, program modules may be located in local and remote computer storage media including storage devices.

Each of the embodiments in the present disclosure is described in a progressive way, and reference may be made between the embodiments for the same and similar parts. Each embodiment focuses on the differences from other embodiments. Especially, for the system embodiment, since it is basically similar to the method embodiment, the description is relatively simple, and the relevant points can only be found in part of the description of the method embodiment.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

The above are just embodiments of the present disclosure, but not intended to limit the present disclosure. Various modifications and variations may be made for those skilled in the art. Any modification, equivalent substitution, improvement and the like made within the spirit and principle of the present disclosure shall be included in the scope of the claims of the present disclosure.

What is claimed is:

1. A page multiplexing method, comprising the following steps:
    acquiring page frame information of a plurality of pages to be configured in a client to be developed, wherein the page frame information comprises component information to be used by the plurality of pages;
    determining a component relational tree corresponding to the pages based on the page frame information, wherein the component relational tree comprises a branch tree corresponding to each page, and for each page, the branch tree corresponding to the page is used for representing dependencies among components comprised in the page;
    comparing the component relational tree with a pre-constructed reference relational tree to determine a target tree structure from the reference relational tree, wherein dependencies among target components comprised in the target tree structure are matched with dependencies of the target components in the component relational tree, and the reference relational tree is constructed based on pages in a developed client; and
    querying component codes of the target components used by the developed client, and multiplexing the component codes to configure the pages in the client to be developed.

2. The method according to claim 1, wherein prior to said comparing the component relational tree with the pre-constructed reference relational tree, the method further comprises:
    determining the pages in the developed client as reference pages;
    determining dependencies among all components in each reference page through a static analysis;
    determining component information corresponding to each component in each reference page based on the dependencies; and
    constructing the reference relational tree by taking each component in each reference page as a node, wherein for each node in the reference relational tree, the node stores the component information of a component corresponding to the node, wherein the reference relational tree comprises a branch tree corresponding to each reference page; and wherein for each reference page, a branch tree corresponding to the reference page is used for representing dependencies among components comprised in the reference page.

3. The method according to claim 2, wherein said determining the component information corresponding to each component in each reference page based on the dependencies further comprises:
    determining, for each component in each reference page, a component template corresponding to each component from each page code corresponding to each reference page based on the dependencies among all components in each reference page;
    converting the component template of the component into a character string;
    matching the character string by a preset regular expression to determine a plurality of label structures comprised in the component template;
    generating an abstract syntax tree AST based on the plurality of label structures; and
    determining component information corresponding to the component according to the AST.

4. The method according to claim 1, wherein said determining the component relational tree corresponding to the plurality of pages based on the page frame information further comprises:
    constructing a component relational tree comprising a branch tree corresponding to each page by taking each component in the page frame information as a node, wherein for each node in the component relational tree, the node stores component information of a component corresponding to the node.

5. The method according to claim 1, wherein said comparing the component relational tree with the pre-constructed reference relational tree to determine the target tree structure from the reference relational tree further comprises:

comparing each component in the component relational tree with each component in the pre-constructed reference relational tree to determine the target tree structure from the reference relational tree based on a depth-first traversal mode.

6. The method according to claim 5, wherein said comparing each component in the component relational tree with each component in the pre-constructed reference relational tree to determine the target tree structure from the reference relational tree further comprises:
  determining whether each component in the component relational tree is a basic component;
  in response to the component being not a basic component, determining whether the component has a child component in the component relational tree;
  in response to the component having no child component in the component relational tree, determining whether the pre-constructed reference relational tree has the component;
  in response to the reference relational tree having the component, marking the component in the reference relational tree, and determining the marked component as a target component, so as to determine the target tree structure composed of all the target components in the reference relational tree; and
  in response to the reference relational tree not having the component, determining whether a next component of the component in the component relational tree is a basic component.

7. The method of claim 6, further comprising:
  in response to the component being a basic component, determining whether the pre-constructed reference relational tree has the component;
  in response to the reference relational tree having the component, marking the component in the reference relational tree, and determining the marked component as the target component, so as to determine the target tree structure composed of all the target components in the reference relational tree; and
  in response to the reference relational tree not having the component, determining whether a next component of the component in the component relational tree is a basic component.

8. The method of claim 6, further comprising:
  in response to the component having a child component in the component relational tree, determining whether the child component of the component is a basic component in the component relational tree until it is determined that a component has no child component.

9. The method according to claim 6, wherein after marking the component in the reference relational tree, the method further comprises:
  determining whether the component has a child component in the component relational tree;
  in response to the component in the component relational tree having a child component, determining whether the component in the reference relational tree has a child component; and
  in response to the component in the reference relational tree having no child component, unmarking the component.

10. The method of claim 9, further comprising:
  in response to the component in the component relational tree having no child component, determining whether the next component of the component in the component relational tree is a basic component.

11. The method of claim 9, further comprising:
  in response to the component in the reference relational tree having a child component, determining whether the child component of the component in the component relational tree is a basic component.

12. The method according to claim 1, wherein the component information at least comprises: a component name, a component path, component dependency data, an event, a child component and a parent component.

13. The method of claim 1, wherein a storage structure of the component relational tree is based on a double linked list.

14. The method of claim 1, wherein the component code at least comprises: a component style code and a component logic code; and
  wherein said multiplexing the component codes further comprises:
  determining a number of the target components comprised in the target tree structure in the reference relational tree as a first number;
  determining a branch tree comprising the target tree structure and representing a complete page as a target branch tree;
  determining a number of components comprised in the target branch tree as a second number;
  determining a ratio of the first number to the second number;
  in response to the ratio being greater than a preset threshold, multiplexing the component style code and the component logic code in the component code; and
  in response to the ratio being not greater than a preset threshold, multiplexing the component style code in the component code.

15. A page multiplexing device, comprising:
  an acquisition module configured for acquiring page frame information of a plurality of pages to be configured in a client to be developed, wherein the page frame information comprises component information to be used by the plurality of pages;
  a determination module configured for determining a component relational tree corresponding to the pages based on the page frame information, wherein the component relational tree comprises a branch tree corresponding to each page, and for each page, the branch tree corresponding to the page is used for representing dependencies among components comprised in the page;
  a comparison module configured for comparing the component relational tree with a pre-constructed reference relational tree to determine a target tree structure from the reference relational tree, wherein dependencies among target components comprised in the target tree structure are matched with dependencies of the target components in the component relational tree, and the reference relational tree is constructed based on pages in a developed client;
  a page multiplexing module configured for querying component codes of the target components used by the developed client, and multiplexing the component codes to configure the pages in the client to be developed; and
  a controller configured for starting up and shutting down the acquisition module, the determination module, the comparison module, the page multiplexing module, and the page multiplexing module.

16. A computer-readable storage medium, wherein the storage medium stores a computer program which, when executed by a processor, implements the method according to any claim 1.

17. An electronic apparatus, comprising:
a memory,
a processor, and
a computer program stored in the memory and executable on the processor,
wherein when executing the program, the processor implements the method according to claim 1.

* * * * *